(12) United States Patent
Le et al.

(10) Patent No.: US 7,154,877 B2
(45) Date of Patent: Dec. 26, 2006

(54) SYSTEM AND METHOD FOR BEST EFFORT SCHEDULING

(75) Inventors: Lich Le, Carlsbad, CA (US); Ash Kapur, Frederick, MD (US); Victor Zhodzishsky, North Potomac, MD (US)

(73) Assignee: Broadcom Corporation, Irvine, CA (US)

( * ) Notice: Subject to any disclaimer, the term of this patent is extended or adjusted under 35 U.S.C. 154(b) by 914 days.

(21) Appl. No.: 09/927,125

(22) Filed: Aug. 10, 2001

(65) Prior Publication Data
US 2003/0035434 A1  Feb. 20, 2003

(51) Int. Cl.
*H04J 3/16* (2006.01)

(52) U.S. Cl. .................. 370/346; 370/347; 370/449; 370/458

(58) Field of Classification Search ............. 370/346, 370/347, 449, 450, 458
See application file for complete search history.

(56) References Cited

U.S. PATENT DOCUMENTS

| | | | | |
|---|---|---|---|---|
| 5,613,211 A | * | 3/1997 | Matsuno | 455/502 |
| 6,078,959 A | * | 6/2000 | Wright et al. | 709/227 |
| 6,097,707 A | * | 8/2000 | Hodzic et al. | 370/321 |
| 6,370,381 B1 | * | 4/2002 | Minnick et al. | 455/445 |
| 6,404,750 B1 | * | 6/2002 | Wicker et al. | 370/329 |
| 6,490,256 B1 | * | 12/2002 | Jones et al. | 370/277 |
| 6,654,957 B1 | * | 11/2003 | Moore et al. | 725/111 |
| 6,865,165 B1 | * | 3/2005 | Huttunen | 370/329 |

OTHER PUBLICATIONS

Specification of the Bluetooth System, Wireless Connections Made Easy v. 1.0B Dec. 1, 1999, pp. 1-1080 Specification vol. 1.

* cited by examiner

*Primary Examiner*—John Pezzlo
*Assistant Examiner*—Inder Pal Mehra
(74) *Attorney, Agent, or Firm*—McAndrews, Held & Malloy, Ltd.

(57) ABSTRACT

A system and method for increasing bandwidth usage between an access point and a wireless device are described. One embodiment can include an access point, a prioritizer, and a priority storage device. These components can increase bandwidth usage between an access point and a wireless device by allocating previously unused transmission slots.

22 Claims, 4 Drawing Sheets

SYSTEM AND METHOD FOR BEST EFFORT SCHEDULING

FIELD OF THE INVENTION

The present invention relates to access points for wireless devices. In particular, but not by way of limitation, the present invention relates to systems and methods for best effort scheduling of an access point's transmission slots.

BACKGROUND OF THE INVENTION

The proliferation of portable, wireless devices has created a high demand for systems and methods to provide connectivity to various networks. One protocol that has been developed to provide such connectivity is Bluetooth, which is described in *The Specification of the Bluetooth System,* v1.0 B, Dec. 1, 1999 and is incorporated herein by reference. Bluetooth defines a communication protocol for wireless devices, such as personal digital assistants (PDAs). For example, FIG. 1 shows one implementation of a Bluetooth system 100 that includes a plurality of access points 115 connected to servers 120 through a network 110. Wireless devices 105 that are near the access points 115 can interact with the servers 120 through one of the access points 115. In some systems, the wireless devices 105 can access other devices such as peripheral devices, private networks, other wireless systems, etc.

Typically, Bluetooth-enabled access points have limited range and limited connection capacity. Bluetooth, for example, presently limits to seven the number of wireless devices that can actively connect to an access point. Additionally, Bluetooth limits the interaction between an access point and the wireless devices connected to it. For example, a wireless device can only transmit data to the access point when it is polled by that access point. To prevent blocking, i.e., to prevent one wireless device 105 from using all of the bandwidth, an access point 115 is required to poll each actively connected wireless device every N transmission slots, where N is defined by the clock accuracy of the wireless devices, by default, or by quality of service (QOS) parameters. In a simplified example, if there were five transmission slots per cycle and five wireless devices, then each device would get polled once per cycle.

This type of round robin scheduling assumes that each wireless device has the same amount of data to upload to the access point and that the upload rate will be constant. Modern communications, however, tend to be bursty rather than constant, and because Bluetooth does not define a method for addressing the bursty flow of data, present systems cause some wireless devices to be idle when they could otherwise be uploading data to the access point. Consider, for instance, the hypothetical case with ten transmission slots per cycle and five wireless devices connected to one of the access points. As before, each wireless device should get polled at least once each cycle. Present access points, for example, would poll the five wireless devices in the first five transmission slots and then poll none of the devices during the next five transmission slots. Table 1 illustrates the transmission slot allocation of such present access points. As is illustrated, no wireless device is capable of uploading data to the access point during transmission slots 6–10.

TABLE 1

| | Transmission slot allocation | | | | | | | | | |
|---|---|---|---|---|---|---|---|---|---|---|
| Transmission Slot | 1 | 2 | 3 | 4 | 5 | 6 | 7 | 8 | 9 | 10 |
| Device Being Polled | 1 | 2 | 3 | 4 | 5 | EMPTY | EMPTY | EMPTY | EMPTY | EMPTY |

By not allocating the empty transmission slots, e.g., slots 6–10, to any wireless device, present access points waste precious bandwidth and slow the exchange of data with wireless devices. Because high bandwidth is one key to commercial success of Bluetooth-based and other wireless devices, a system and method is needed to better utilize transmission slots available to access points.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for increasing bandwidth usage between an access point and a wireless device. One embodiment of the invention can include an access point, a prioritizer, and a priority storage device. Together, these components can increase bandwidth usage between an access point and a wireless device by allocating previously unused transmission slots.

In some embodiments according to the present invention, a content provider is in communication with an access point.

For example, the access point can establish an initial polling rate with a number of wireless devices and poll each of those devices according to that established rate. For Bluetooth-enabled wireless devices, data can generally only be transferred to the access point after being polled by the access point. Thus, the number of times that the access point polls a wireless device is directly related to the amount of data that the device can upload to the access point. The wireless devices, however, are not required to upload data responsive to being polled and in many cases do not.

Whether or not a particular device uploads data responsive to being polled, the amount of data—or lack thereof—that a wireless device transfers to the access point can be stored and used to calculate a priority for that device. If, for example, a particular wireless device transferred the maximum allowed amount of data to the access point, it could receive a higher priority than a device that transferred a small amount of data. Some embodiments of the present invention, however, store indicators other than the amount of data. For example, one embodiment involves the wireless device transmitting to the access point a flag that indicates that more data needs to be uploaded.

The priority assigned to a particular wireless device could be based solely upon the previous cycle's uploading activity, or it could be based upon the uploading activity in a number of previous cycles. For example, a priority can be assigned to a wireless device based upon uploading activity for the wireless device over the prior three cycles. In this type of system when multiple cycles are used to calculate the priority, the priority can be based on a straight average of the uploading activity over the last few cycles or based upon a weighted average of the uploading activity over the last few cycles. Of course, those of skill in the art could calculate the priority factor in a number of ways using any number of polling cycles.

Using the calculated priorities for the wireless devices actively connected to the access point, one embodiment of the present invention can allocate otherwise unallocated transmission slots to the wireless device(s) with a higher priority. In other words, an access point can poll a wireless device with a high priority during a time slot that previously would have gone unused. Transmission slots that are allocated based upon priority are referred to as priority allocated transmission slots.

In some embodiments, all unallocated transmission slots are allocated to the single wireless device with the highest priority, and in other embodiments, the unallocated transmission slots are divided among multiple higher priority devices. In either case, however, a wireless device's uploading activity during these priority allocated transmission slots can be recorded and used to modify the priority for that wireless device. For example, if the wireless device receives five priority allocated transmission slots and only fully uses three of them, that device's priority can be reduced, thereby possibly making the unused transmission slots in the next cycle available to some other wireless device.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
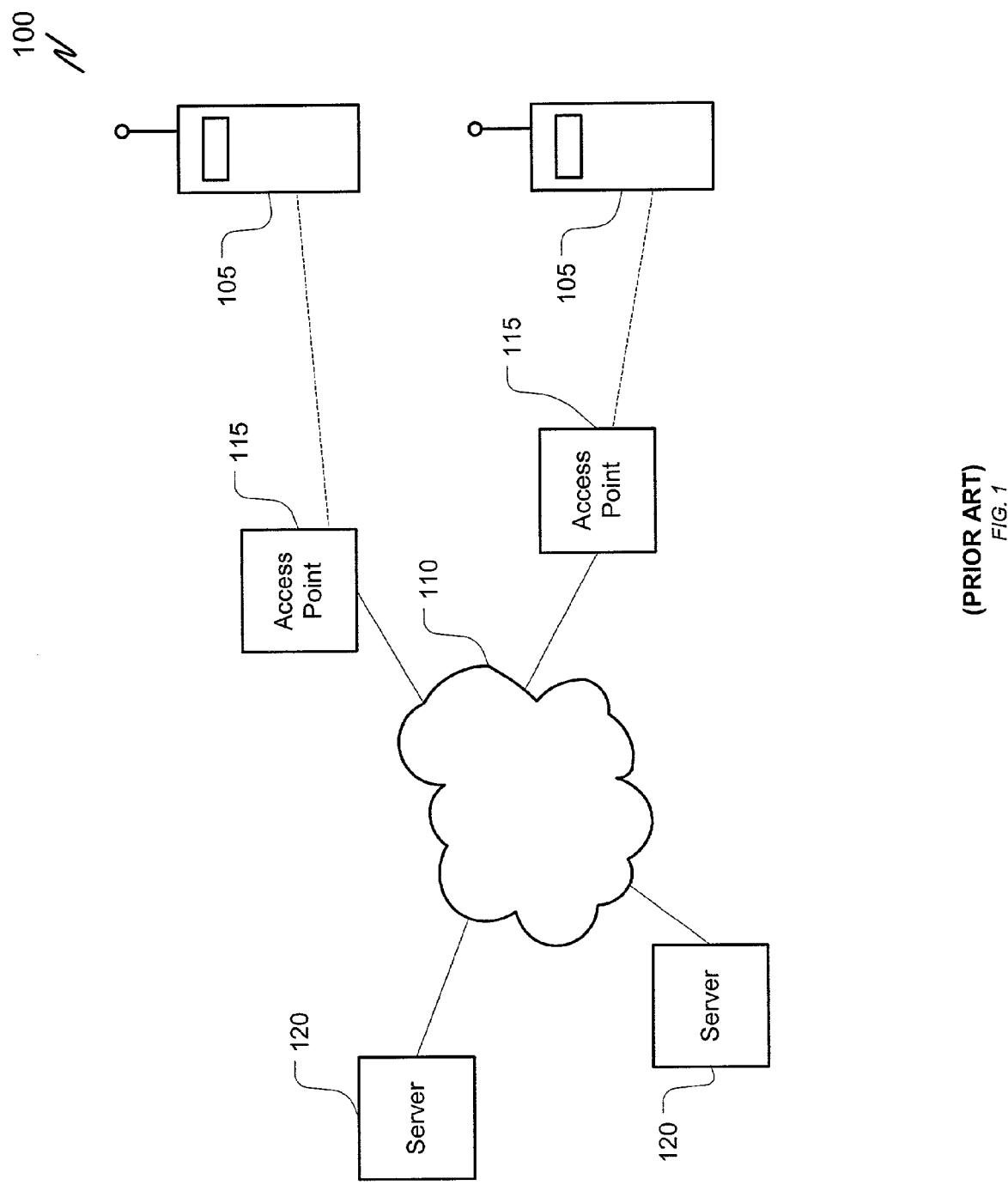
FIG. 1 is a block diagram of an existing network and network access system.
Figure 2:
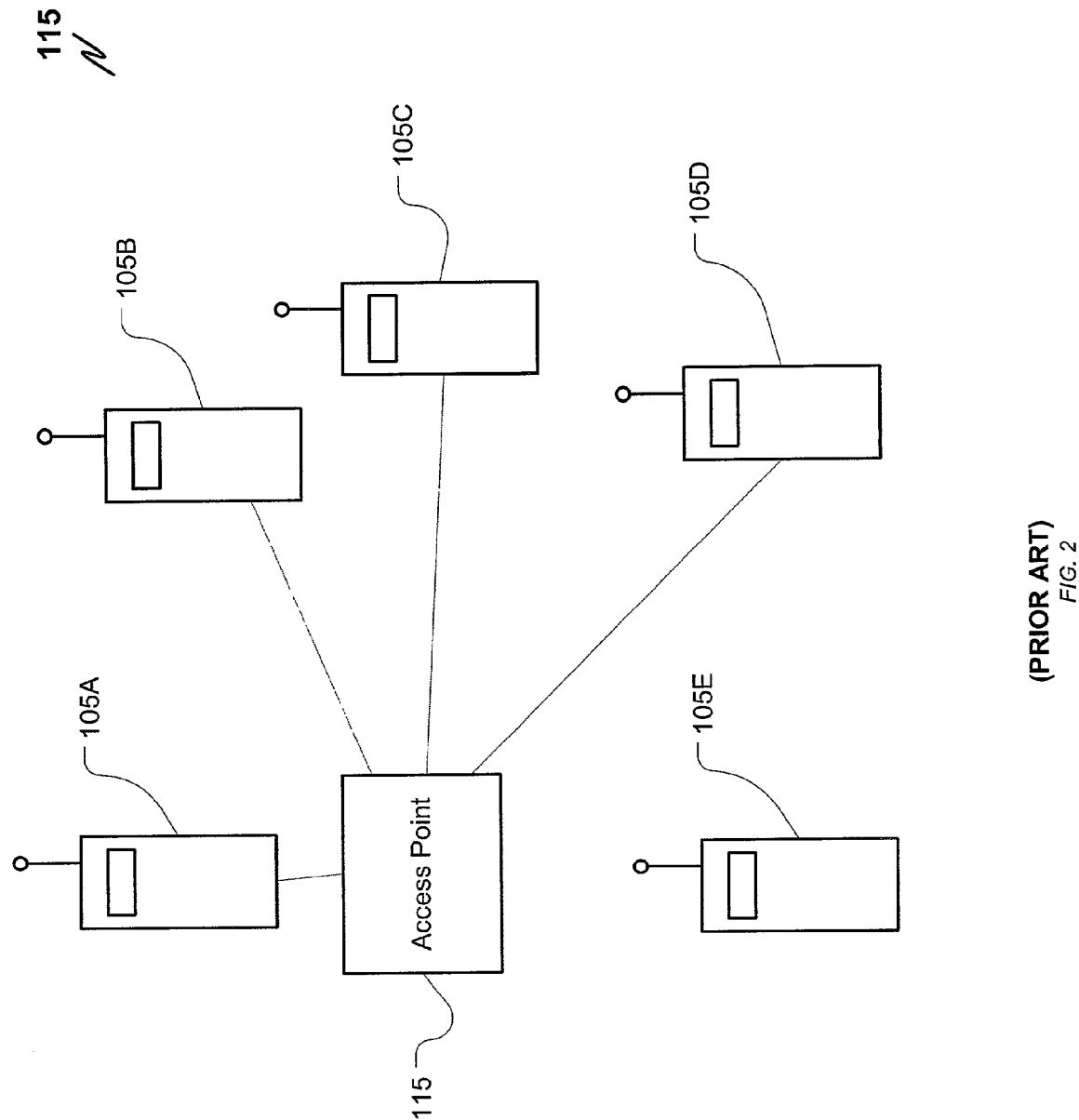
FIG. 2 is a block diagram of an existing network a access system.

Referring now to the drawings, where like or similar elements are designated with identical reference numerals throughout the several views, and referring in particular to FIG. 2, it is a block diagram of an existing network access point 115. In this implementation, the access point 115 is hard-wired to a network 110 (shown in FIG. 1). In other versions, however, the access point 115 could be connected to the network 110 through a high-speed wireless link or other link (not shown).

To access the network 110, a wireless device 105 within range of an access point 115 establishes a connection with that access point. Once a connection is established, the wireless device 105 can receive information from and transmit information to the network 110 via the access point 115. In FIG. 2, wireless devices 105A, 105B, 105C and 105D are actively connected to the network (shown by dashed line) and wireless device 105E is either not connected or in, for example, a Bluetooth-defined PARK mode.

Figure 3:
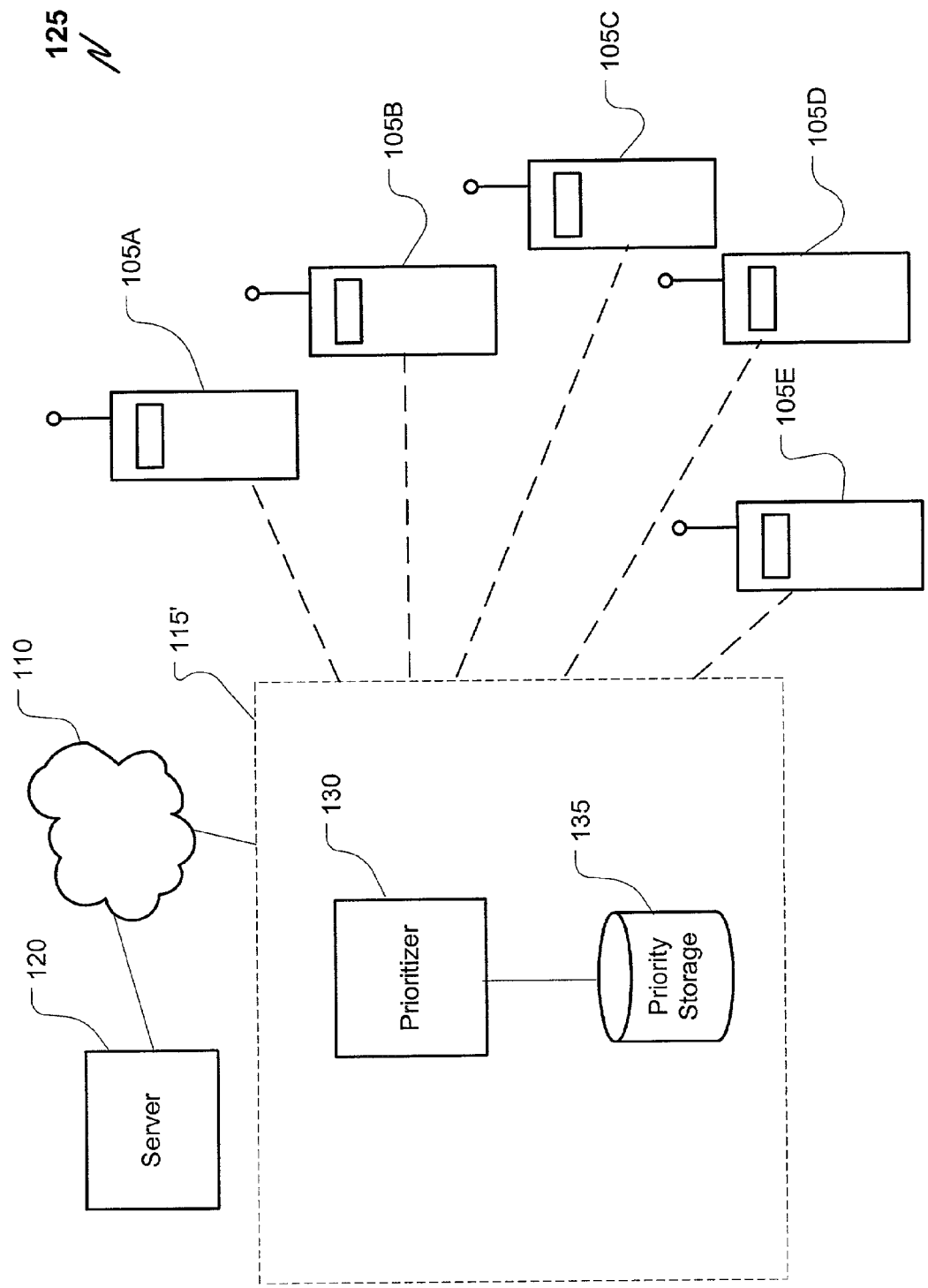
FIG. 3 is a block diagram of one embodiment of a network access system constructed in accordance with the principles of the present invention.

Referring now to FIG. 3, it is a block diagram of one embodiment of a network access system 125 constructed in accordance with the principles of the present invention. This embodiment includes an access point 115', a prioritizer 130, and a priority storage module 135. Although these components are shown separately, one skilled in the art can recognize that the components can be combined and housed as a single component.

As with the access point 115 described with relation to FIG. 2, wireless device 105 can establish a connection with the access point 115' of FIG. 3 and thereby access the network 110. In this embodiment, however, the prioritizer 130 and the priority storage module 135 allocate transmission slots that would not have been allocated by the conventional access point 115 of FIG. 2. The operation of the inventive access point 115' of FIG. 3 is best illustrated by reference to the flowchart of FIG. 4 and the accompanying text.

Figure 4:
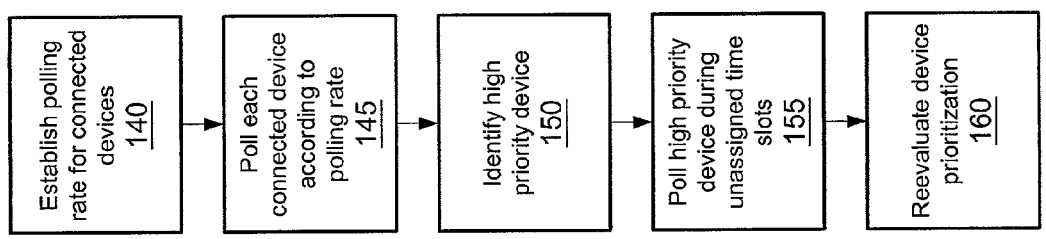
FIG. 4 is a flowchart of one method according to the present invention for operating a network access system.

Referring now to FIG. 4, the network access system 125 operates by establishing an initial polling rate for the wireless devices 105A–E (step 140). The method of establishing this polling rate is well known in the art and, thus, is not described herein. After the initial polling rate has been established, the access point 115' begins polling each of the actively-connected wireless devices 105A–E (step 145). The prioritizer records, in the priority storage module 135, the amount of data, or some indicator thereof, that each wireless device 105 uploads to the access point 115'. Using that recorded data, the prioritizer 130 calculates a priority (or ranking) for the wireless devices 105 (step 150). Next, the prioritizer 130 allocates unassigned transmission slots to the wireless device 105 with the highest priority and causes the access point 115' to poll the wireless device 105 for each of those transmission slots (step 155). Assuming that the prioritizer 130 determines that wireless device 105A has the highest priority for the next cycle and that wireless devices 105A–E are actively connected to the access point 115, Table 2 represents an exemplary time slot allocation.

TABLE 2

| | Transmission slot allocation | | | | | | | | | |
|---|---|---|---|---|---|---|---|---|---|---|
| Transmission Slot | 1 | 2 | 3 | 4 | 5 | 6 | 7 | 8 | 9 | 10 |
| Device Being Polled | 105A | 105B | 105C | 105D | 105E | 105A | 105A | 105A | 105A | 105A |

The prioritizer 130 can also record the upload activity of a wireless device 105 during the priority allocated transmission slots and change that device's priority accordingly. For example, the prioritizer can record the activity of wireless device 105A over transmission slots 6–10 as shown in Table 2 and adjust the priority of device 105A to reflect its uploading activity during those time periods.

In certain embodiments, before a wireless device 105 is finished uploading data to the access point 115', the device 105 may include an indicator, e.g., flag, in the uploaded data that indicates that more data is to follow. When the uploaded data includes such an indicator, the prioritizer 130 can change the device's priority accordingly. For example, if wireless device 105A included an indicator in its uploaded data in transmission slot 7 (as shown in Table 3), that device's priority could be lowered and transmission slots 8–10 reallocated to a different wireless device 105 (step 160). Alternatively, the prioritizer 130 could finish the cycle with the priorities as they are and adjust the priorities for the next cycle. In other words, the access point 115' could still poll wireless device 105A during transmission slots 8–10 despite receiving an end-of-upload indicator. Device 105A's priority, however, could be changed for the next cycle.

TABLE 3

Transmission slot allocation

| Transmission Slot | 1 | 2 | 3 | 4 | 5 | 6 | 7 | 8 | 9 | 10 |
|---|---|---|---|---|---|---|---|---|---|---|
| Device Being Polled | 105A | 105B | 105C | 105D | 105E | 105A | 105A | 105D | 105D | 105D |

In conclusion, the present invention provides, among other things, a system and method for increasing bandwidth usage between an access point and a wireless device. Although embodiments of the present invention are described with relation to Bluetooth and access points, those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for allocating a plurality of transmission slots to a first wireless device, wherein the plurality of transmission slots includes a plurality of allocated transmission slots and a plurality of unallocated transmission slots, the method comprising:

establishing a first polling rate for a first wireless device, wherein the first polling rate allocates at least a first of the plurality of allocated transmission slots to the first wireless device;

polling the first wireless device according to the established first polling rate;

recording the upload activity by the first wireless device in response to the polling; and allocating a first of the plurality of unallocated transmission slots to the first wireless device based upon the recorded upload activity.

2. The method of claim 1, further comprising:

determining a first priority for the first wireless device; wherein the first priority is based upon the recorded upload activity.

3. The method of claim 1, further comprising:

establishing a second polling rate for a second wireless device, wherein the second polling rate allocates at least a second of the allocated transmission slots to the second wireless device;

polling the second wireless device according to the second polling rate;

recording the upload activity by the second wireless device in response to the polling;

determining a priority for the second wireless device, wherein the priority for the second wireless device is based upon the recorded upload activity for the second wireless device; and determining that the priority for the first wireless device is higher than the priority for the second wireless device.

4. The method of claim 1, wherein recording of the upload activity comprises:

recording an amount of data uploaded from the first wireless device.

5. The method of claim 1, wherein the recording of the upload activity comprises:

recording an indicator that more data needs to be uploaded from the first wireless device.

6. A method for allocating one of a plurality of transmission slots, wherein the plurality of transmission slots includes a plurality of allocated transmission slots and a plurality of unallocated transmission slots, the method comprising:

determining a first priority factor for a first wireless device, the first priority factor based upon an amount of data uploaded by the first wireless device to an access point during a first of the plurality of allocated transmission slots;

determining a second priority factor for a second wireless device, the second priority factor based upon an amount of data uploaded by the second wireless device to the access point during a second of the plurality of allocated transmission slots;

comparing the first priority factor and the second priority factor;

identifying the first wireless device as a priority wireless device based upon the comparison; and allocating a first of the plurality of unallocated transmission slots to the priority wireless device.

7. The method of claim 6, further comprising:

receiving upload data from the priority wireless device in the first of the plurality of unallocated transmission slots.

8. The method of claim 7, the method further comprising:

recalculating the first priority factor, the recalculated, first priority factor based upon upload activity in the first of the plurality of unallocated transmission slots.

9. The method of claim 8, further comprising:

determining that the second priority factory is of a higher priority than the recalculated first priority factor; and allocating a second of the plurality of unallocated transmission slots to the second wireless device responsive to determining that the second priority factory is of a higher priority than the recalculated first priority factor.

10. A system for allocating a plurality of transmission slots to a first wireless device, wherein the plurality of transmission slots includes a plurality of allocated transmission slots and a plurality of unallocated transmission slots, the system comprising:

a processor;

a storage device; and a plurality of instructions stored within the storage device, the plurality of instructions configured to cause the processor to:

establish a first polling rate for the first wireless device, wherein the first polling rate allocates at least a first of the plurality of allocated transmission slots to the wireless device;

poll the first wireless device according to the first polling rate;

record the upload activity by the first wireless device in response to the polling; and allocate a first of the plurality of unallocated transmission slots to the first wireless device based upon the recorded upload activity.

11. The system of claim 10, wherein the plurality of instructions are further configured to cause the processor to:

determine a priority for the first wireless device;

wherein the priority is based upon the recorded upload activity.

12. The system of claim 10 wherein the plurality of instructions are further configured to cause the processor to:

establish a second polling rate for a second wireless device, wherein the second polling rate allocates at least a second of the allocated transmission slots to the second wireless device;

poll the second wireless device according to the second polling rate;

record the upload activity by the second wireless device in response to the polling;

determine a priority for the second wireless device, wherein the priority for the second wireless device is based upon the recorded upload activity for the second wireless device; and determine that the priority for the first wireless device is higher than the priority for the second wireless device.

13. A system for allocating one of a plurality of transmission slots, wherein the plurality of transmission slots includes a plurality of allocated transmission slots and a plurality of unallocated transmission slots, the system comprising:

means for determining a first priority factor for a first wireless device, the first priority factor based upon an amount of data uploaded by the first wireless device to an access point during a first of the plurality of allocated transmission slots;

means for determining a second priority factor for a second wireless device, the second priority factor based upon an amount of data uploaded by the second wireless device to an access point during a second of the plurality of allocated transmission slots;

means for identifying as a priority wireless device one of the first wireless device and the second wireless device based upon comparison of the first priority factor and the second priority factor; and means for allocating a first of the plurality of unallocated transmission slots to the priority wireless device.

14. The system of claim 13, further comprising:

means for receiving upload data from the priority wireless device in the first of the plurality of unallocated transmission slots.

15. The system of claim 14, wherein the priority wireless device is the first wireless device, the system further comprising:

means for recalculating the first priority factor, the recalculated first priority factor based upon upload activity in the first of the plurality of unallocated transmission slots.

16. An access point that allocates one or more transmission slots of a plurality of transmission slots and polls a wireless device, the access point comprising:

a prioritizer; and a priority storage device connected to the prioritizer, wherein the prioritizer changes a priority of the wireless device based on a measure of upload activity from the wireless device.

17. The system of claim 16, further comprising:

a content provider in communication with the access point.

18. The system of claim 16, further comprising:

a wireless device in communication with the access point.

19. A method for operating a wireless device, the method comprising:

receiving a first polling signal from an access point;

responding to the first polling signal during a first allocated transmission slot by uploading a first amount of data;

receiving a second polling signal from the access point, wherein the second polling signal corresponds to the first amount of data uploaded;

uploading a second amount of data to the access point responsive to the second polling signal from the access point.

20. The method of claim 19, wherein the first polling signal and the second polling signal are associated with a single polling cycle.

21. A method for operating a wireless device, the method comprising:

receiving a first polling signal from an access point;

responding to the first polling signal during a first allocated transmission slot by uploading a first set of data and an indicator that indicates that a communication link should be lowered in priority;

receiving a second polling signal from the access point, wherein the second polling signal is responsive to the indicator;

uploading a second set of data to the access point responsive to the second polling signal from the access point.

22. The method of claim 21, wherein the first polling signal and the second polling signal are associated with a single polling cycle.

* * * * *